J. M. HENRY.
CAN MAKING MACHINERY.
APPLICATION FILED OCT. 23, 1911.

1,041,787.

Patented Oct. 22, 1912.
8 SHEETS—SHEET 2.

Witnesses
Inventor
J. M. Henry
By
Attorney

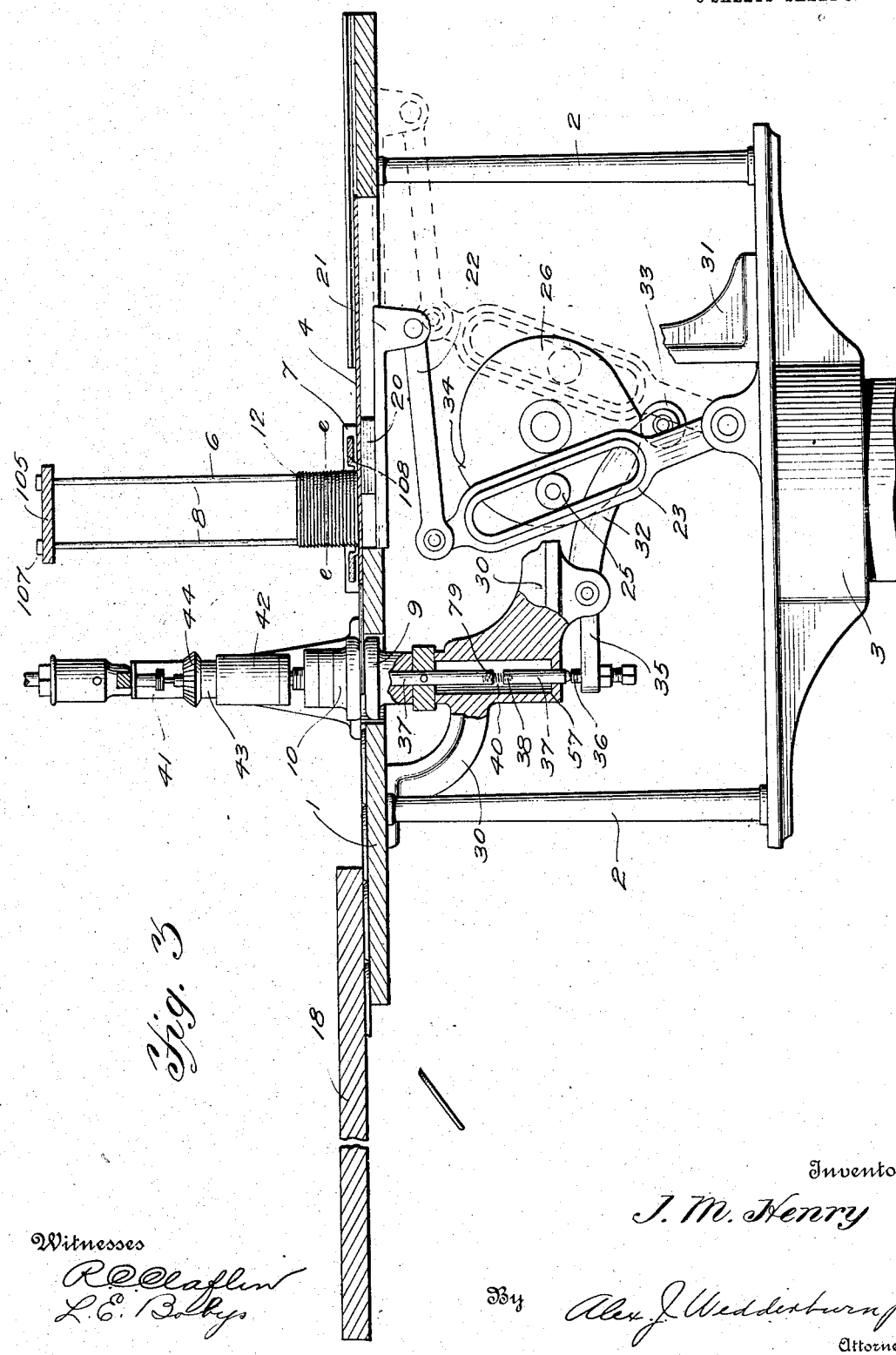

J. M. HENRY.
CAN MAKING MACHINERY.
APPLICATION FILED OCT. 23, 1911.
1,041,787.
Patented Oct. 22, 1912.
8 SHEETS—SHEET 4.
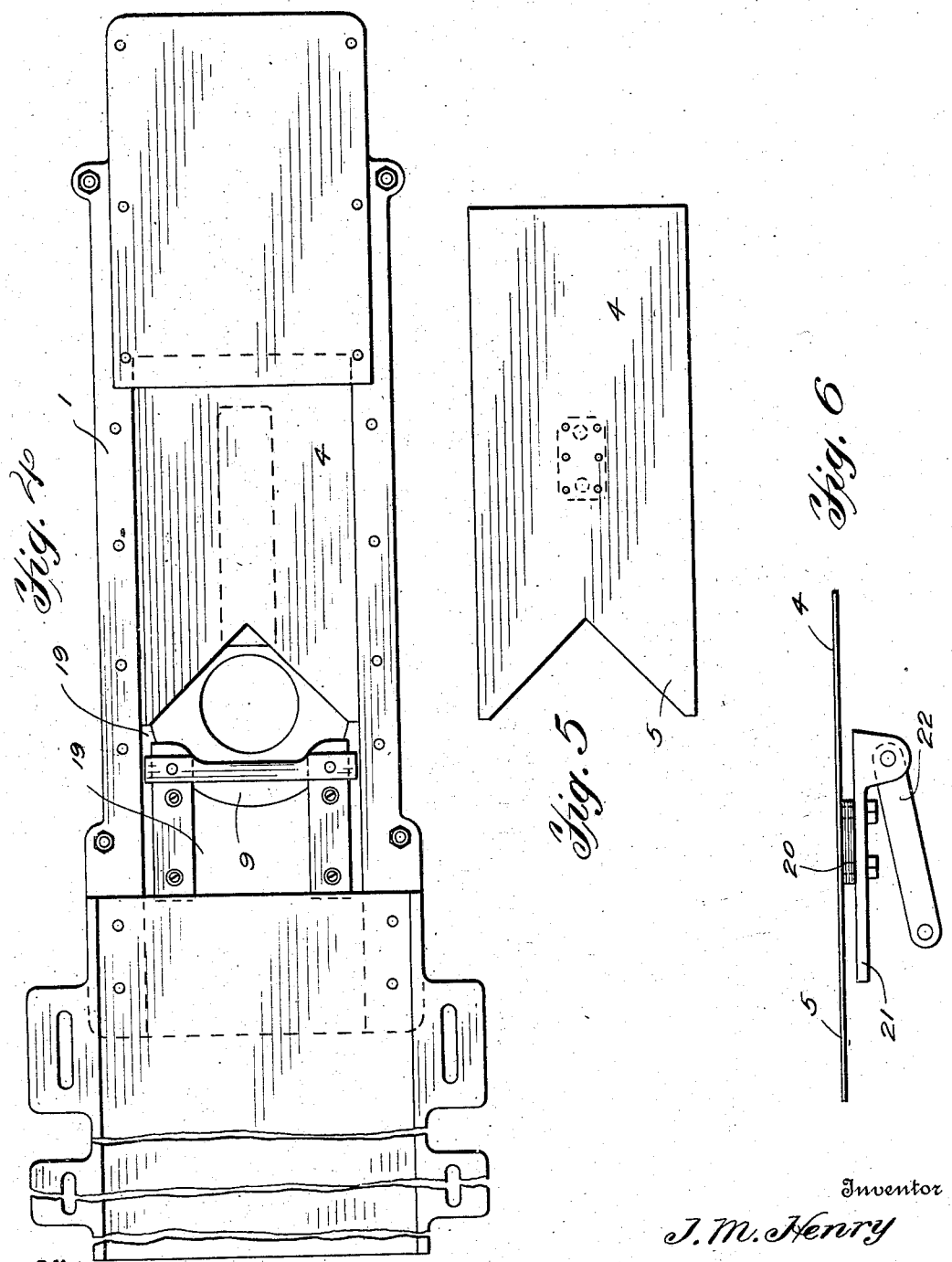

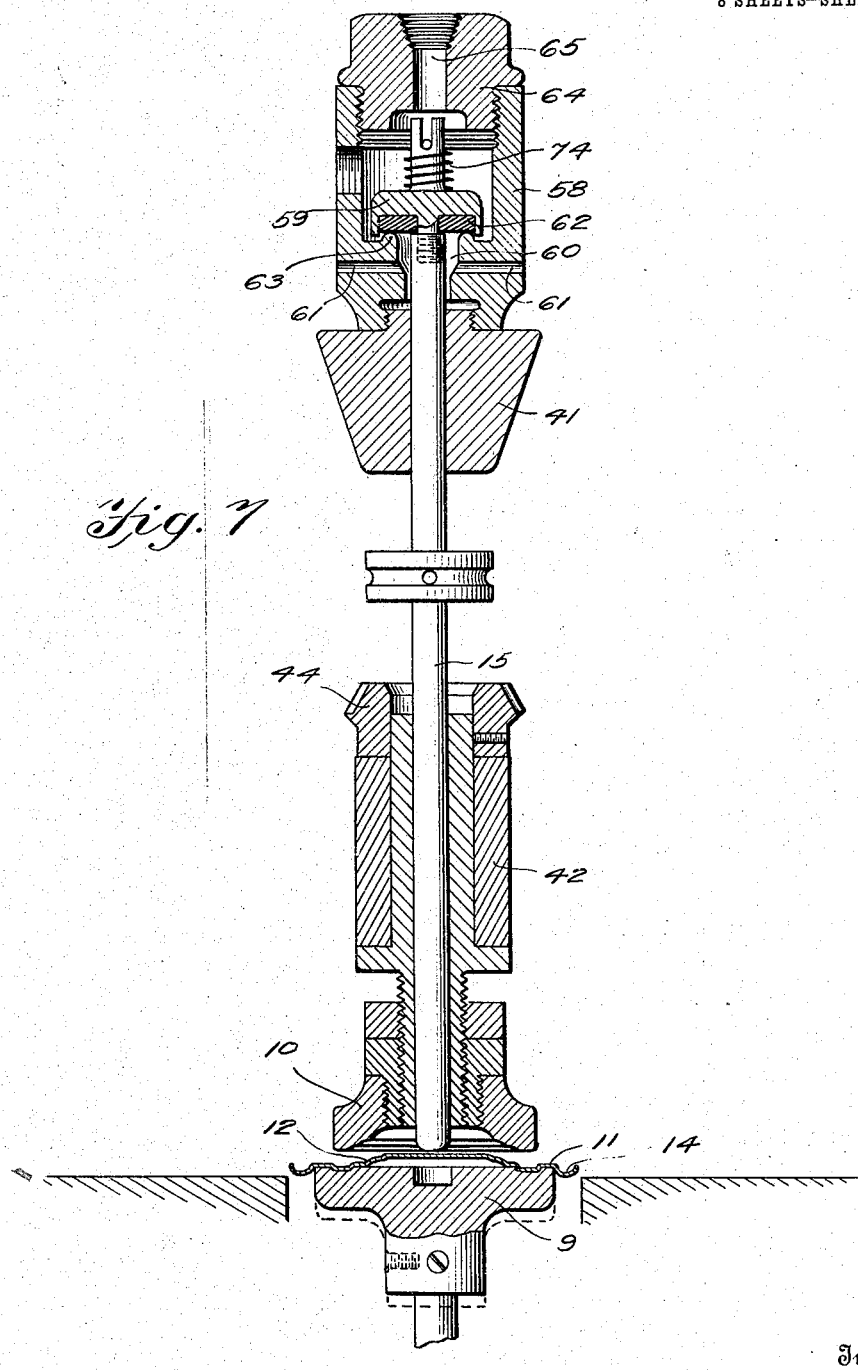

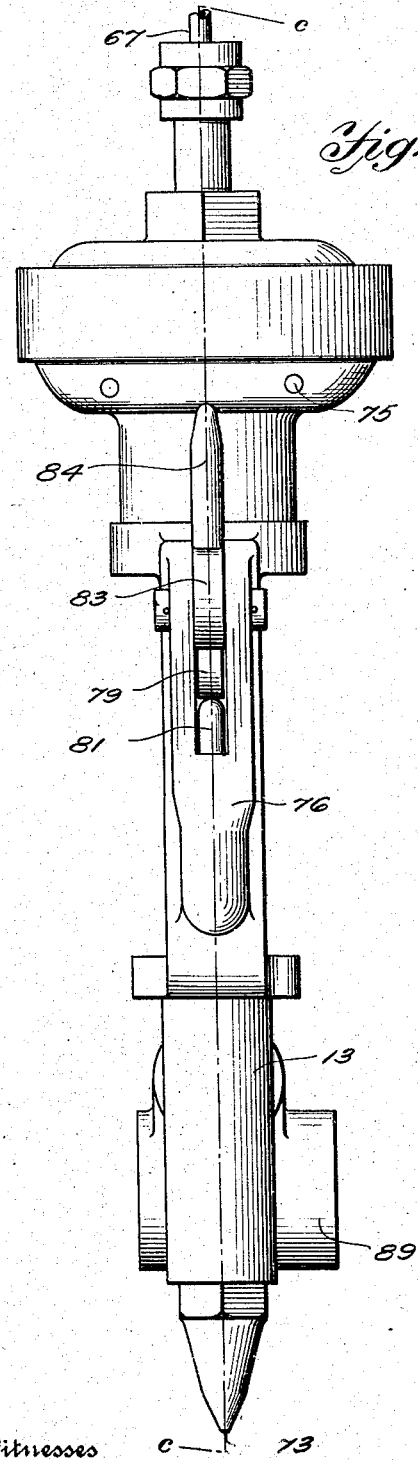
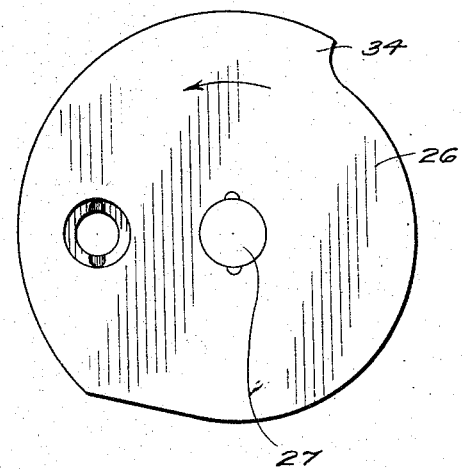
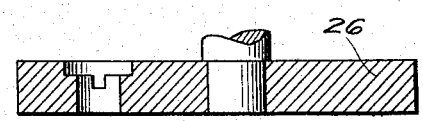

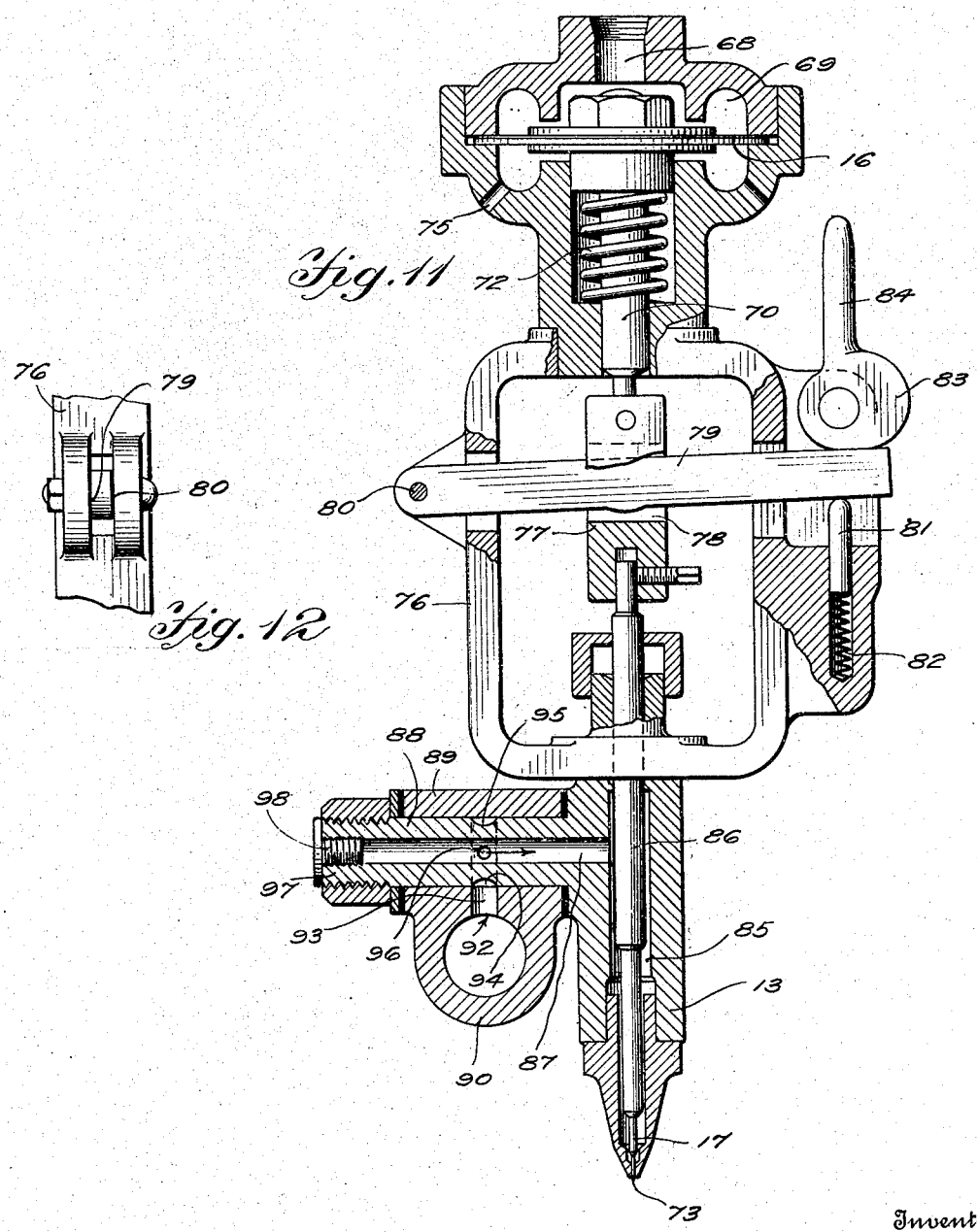

J. M. HENRY.
CAN MAKING MACHINERY.
APPLICATION FILED OCT. 23, 1911.
1,041,787.
Patented Oct. 22, 1912.
8 SHEETS—SHEET 8.
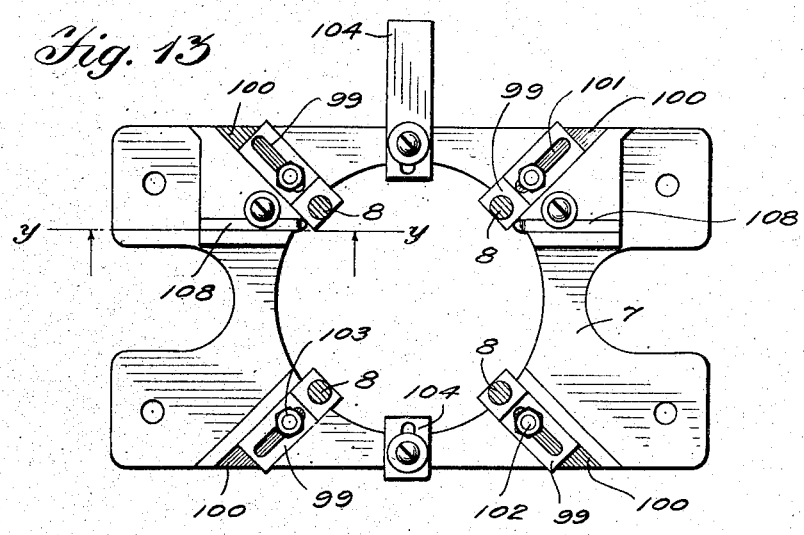
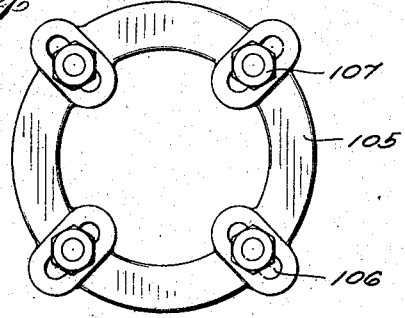
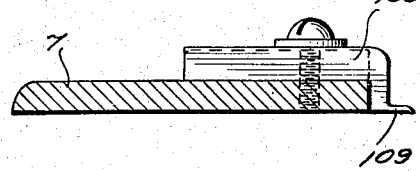
Witnesses
R. C. Claflin
L. E. Bobys
Inventor
J. M. Henry
By Alex J. Wedderburn Jr.
Attorney

UNITED STATES PATENT OFFICE.

JAMES M. HENRY, OF PITTSBURGH, PENNSYLVANIA.

CAN-MAKING MACHINERY.

1,041,787.  Specification of Letters Patent.  Patented Oct. 22, 1912.

Application filed October 23, 1911. Serial No. 656,163.

*To all whom it may concern:*

Be it known that I, JAMES M. HENRY, a citizen of the United States, residing at Pittsburgh, in the county of Allegheny and State of Pennsylvania, have invented certain new and useful Improvements in Can-Making Machinery, of which the following is a specification.

This invention relates to improvements in can making machinery and has for its object to provide a simple, effective and very rapid automatic machine for lining can ends.

With the above and other objects in view, which will hereinafter be more fully explained and claimed, I have invented the device illustrated in the accompanying drawings in which—

Figure 1:
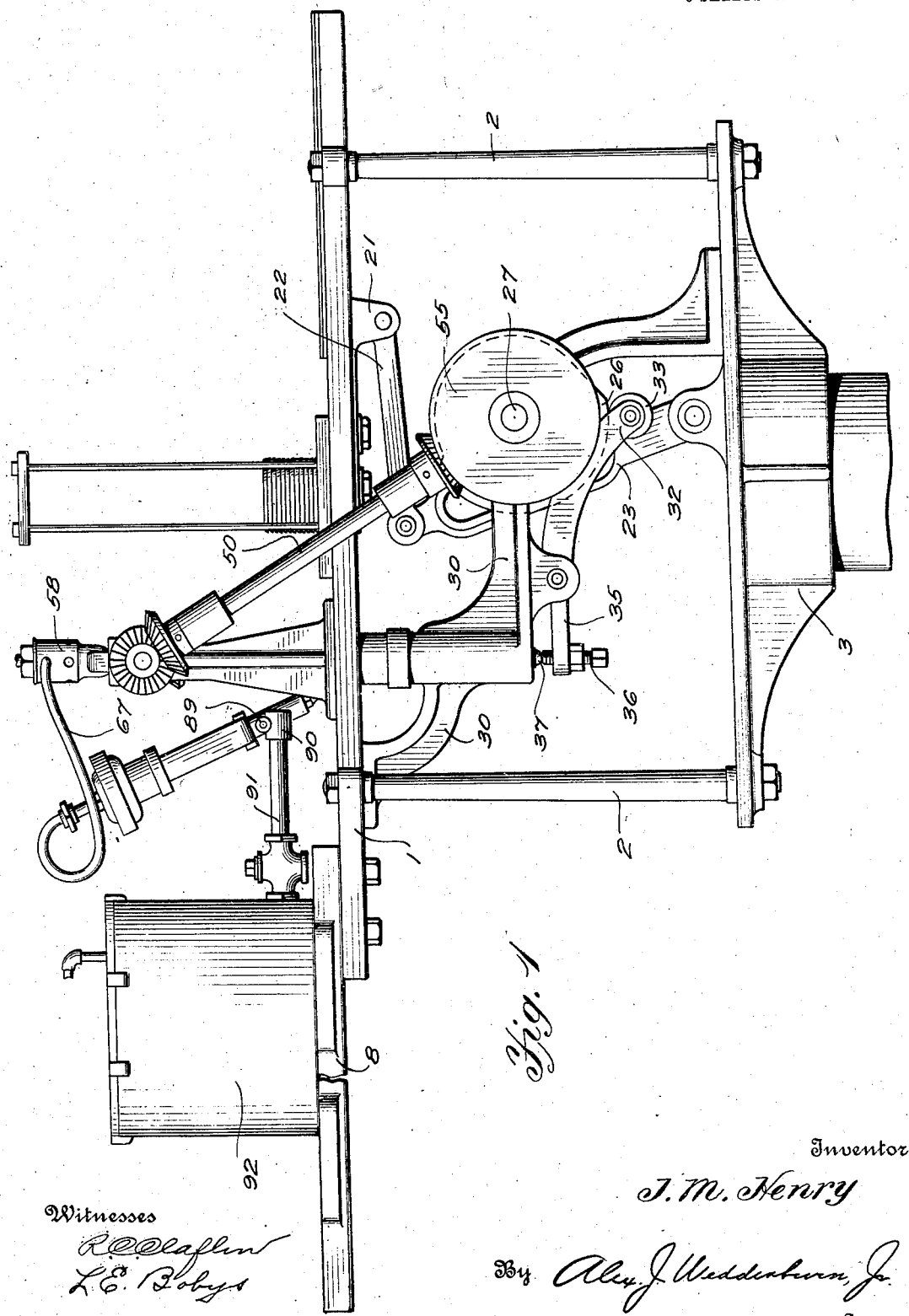
Figure 2:
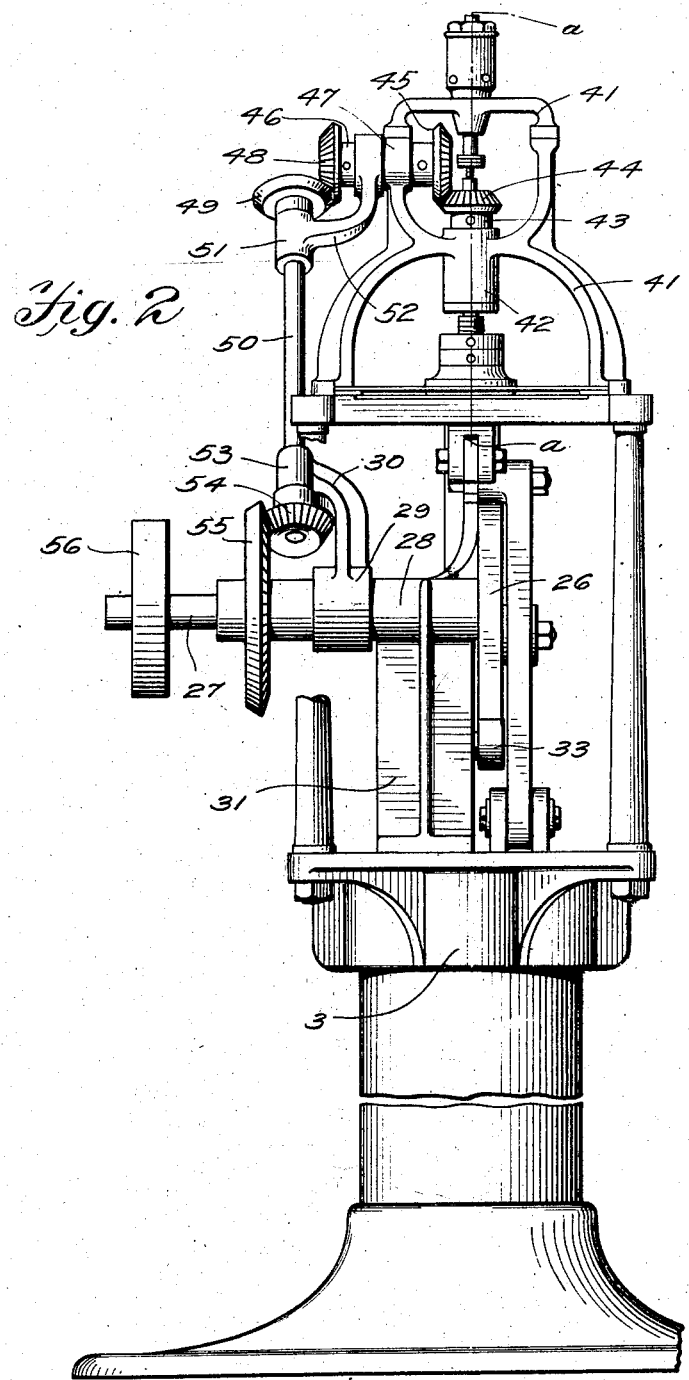

Figure 1 is a side elevation of my improved machine for lining can ends, Fig. 2 is an end elevation thereof, one of the table legs being partially broken away, Fig. 3 is a longitudinal vertical sectional view thereof, Fig. 4 is a top plan detail view of the table of the machine, being partially broken away, Fig. 5 is a detail top plan view of a can end shifting device, Fig. 6 is a side elevation of the shifting device and the members connecting it with the operating mechanism, Fig. 7 is a detail longitudinal sectional view taken on the line $a$—$a$ of Fig. 2, Fig. 8 is a detail elevational view of the lining device, Fig. 9 is a detail elevational view of a cam wheel, Fig. 10 is a sectional view taken on line $b$—$b$ of Fig. 9, Fig. 11 is a sectional view taken on line $c$—$c$ of Fig. 8, Fig. 12 is a fragmental end view of the portion $d$ of Fig. 11, Fig. 13 is an enlarged sectional view taken on line $e$—$e$ of Fig. 3, the can ends being removed, Fig. 14 is a top plan view of a trunnion supporting head, and Fig. 15 is a sectional view taken on line $y$—$y$ of Fig. 13.

Like reference characters indicate like parts throughout the specification and in the various views in the drawings, in which—

1 indicates a table supported on the legs 2 which are bolted to the stand 3. The table 1 is recessed to receive a reciprocating can end shifting member 4 with a V-shaped bifurcated end 5 adapted to engage can ends of various sizes which are stacked in the frame 6, consisting of the plate 7, which is bolted to the table 1, and the adjustable trunnions 8. The shifting member 4 slides the can ends one at a time from the frame 6 to a position directly centered on the turn table 9. As soon as the can end is in position on the turn table 9 the latter is forced upward tightly clamping the can end between the turn table and the revolving chuck 10, the peripheral portion 11 of the can end 12 extending outwardly of the turn table and chuck whereby it may receive the lining compound from the coating stem 13. The can end is given two complete revolutions while receiving the lining compound whereby it is not possible that any portion of the outer groove 14 which engages the can sides will fail to be coated or lined. When the can end passes under the chuck it engages the spring pressed valve stem 15 whereby the air pressure on the diaphragm 16 is relieved, permitting the raising or unseating of the needle valve 17 in the coating stem 13 allowing the lining compound to flow onto the can end while making its two revolutions. After these two revolutions of the can end are completed the turn table drops to dotted position shown in Fig. 7, and the spring pressed stem 15 disengages the can end from the chuck just as the shifting member slides another can end against the one just lined in turn sliding it along on the table and the succeeding can end taking its position on the turn table. After being coated the can ends are slid along on the table one by the other until they pass beneath the tank stand 18 and drop into a suitable receptacle or conveyer to a drier, (not shown).

Now that I have outlined the operation of the device I will go into a detailed description of the operating parts and will first explain the operation of the shifting member and the turn table.

The shifting member 4 is seated in the recess 19 of the table 1 and is mounted on a member 20 which is secured to the reciprocating member 21. The member 20 being vertically adjustable so that the shifting member 4 may be made to engage can ends of different thicknesses. The member 21 is pivotally connected to a link 22, the latter having its other end pivotally connected to the upper end of an oscillating crank 23 which is provided with a slot 24 in which operates a small roller 25 on the cam wheel 26 whereby said crank is oscillated. The location of this roller is so arranged on the cam wheel that the return or outward motion of the crank 23 is twice as rapid as its forward or inward motion. The circumference of the cam wheel being considerably larger on one half thereof than the other half permits the roller 26 to be located in a line with the periphery of the smaller circumference in order to gain this motion. The cam wheel is mounted on a drive shaft 27 which is mounted on the bearings 28 and 29, the latter being on the bracket 30 secured to the table 1 and the former being on the bracket 31 mounted on the stand 3.

Pivotally mounted on the bracket 30 is a lever 32 having a roller 33 on one end thereof, said roller adapted to always engage the edge of the cam wheel 26 so that when the projection 34 on the cam wheel contacts the roller 33 the roller end of the lever 32 is forced down, forcing its other end 35 up, making the screw 36 force up the spindle 37 upon which is mounted the turn table 9 whereby the turn table is made to clamp the can end 12 against the chuck 10 as heretofore explained. The spindle 37 is divided into two parts, the abutting ends 38 and 39 of which are drilled to receive a very strong spring 40 whereby any difference in the thickness of the can ends may be accommodated. This spring connected spindle also prevents absolute rigid connection which would be injurious not only to the machinery but to the can ends as well, all shock being absorbed by the spring 40. The turn table 9 is rotatably mounted on the upper end of the spindle 37 and is made to rotate by its frictional contact with the can ends.

Mounted on and straddling the table 1 is a bracket 41 with a bearing 42 for the rotating spindle 43 which has fixed thereto a bevel gear 44 which is engaged by the bevel gear 45 on the shaft 46 which is mounted in a bearing 47 on the bracket 41. On the other end of this shaft is a bevel gear 48 geared with the bevel gear 49 on the upper end of the shaft 50 which is mounted in the bearings 51 on the bracket 52, and the bearing 53 on the bracket 30. On the lower end of the shaft 50 is a gear 54 intermeshing with the bevel gear 55 mounted on the shaft 27 on the outer end of which is a pulley 56 through the medium of which the entire machine is operated.

The spindle 37 is mounted in the bearing 57 on the bracket 30. And the screw 31 in the lever 35 is adapted to regulate the relative position of the turn table 9 to the chuck 10 whereby adjustment may be readily made for the reception of can ends of different thicknesses.

Mounted on top of the bracket 41 is a valve box 58 into which the valve stem 15 projects. This stem carries a valve 59 adapted to seat over the exhaust port 60 from which a series of outlets 61 extend. A washer 62 located in the valve 59 is adapted to rest against the valve seat 63. The cap nut 64 is provided with an inlet port 65 for air under pressure which is adapted to pass from the valve 58 out through the port 66 and through the pipe 67, through the port 68 into the chamber 69 and press upon the diaphragm 16 whereby the operating stem 70 of the needle valve 17 is held normally down. When the can end 12 forces up the valve stem 15 the upper end 71 thereof enters the port 65, thereby cutting off the supply of compressed air, and at the same time allows the air already compressed in the chamber 69 and the pipe 67 to exhaust through the port 60, thus permitting the spring 72 to raise the member 70, unseating the needle valve and permitting the lining compound which is under pressure to flow through the opening 73 onto the can end until the turn table drops, causing the spring 74 to force down the valve 59 closing the exhaust 60 and causing the air pressure to pass through the valve box 58 and pipe 67 into the chamber 69 and thereby force down the needle valve 17, thus cutting off the flow of the lining material. Air is admitted into the chamber 69 under the diaphragm 16 through the ports 75 so there will be no suction to hold the diaphragm down and prevent quick action thereof.

The coating stem 13 is an integral part of the frame 76, and the needle valve operating stem 70 is divided into two sections connected by a coupling 77 having opening 78 therethrough, through which passes an arm 79 having one end thereof hinged to the frame 76 at 80. The free end of this arm seats on a pin 81 pressed up by a spring 82 whereby said arm is held normally raised when the machine is in operation, but when at rest the cam 83 operated by the handle 84 is adapted to hold the arm down, whereby the needle valve is held in the opening 73 and the lining fluid prevented from escaping.

The member 13 has a passage way 85 therethrough through which the lower end 86 of the needle valve stem passes; this passage way is larger a certain portion of its length than the stem whereby the coating compound may pass from the passage way or tube 87 out through the opening 73. The member 13 has a right-angular tubular portion 88 which is pivotally mounted in the bearing 89 having a connection 90 by means of which it is secured to the pipe 91 leading from the tank 92 in which the liquid lining compound is contained under air pressure. This compound passes through the pipe 91 into the opening 92 and from thence through the passageway 93 through the passage 94 made by the annular groove 95 in the member 88 and from thence through the opening 96 into the tube 87 from whence it passes into the passageway 85 as above explained. The tube 87 extends entirely through to the end 97 of the member 89 and is closed by a screw plug 98 whereby it may be opened and cleaned.

Located on the table 1 is the frame 6 in which the can ends 12 are stacked. This frame is constructed of a base 7 upon which are slidably mounted members 99 operating in the slots 100, and having slots 101 therein, through which bolts 102 pass, having the nuts 103 thereon, whereby said members may be fixed in any desired position in order to hold ends of various sizes. Adjustable guides 104 are also mounted on the base 7. The members 99 carry the trunnions 8 to the upper ends of which is fixed the member 105 having slots 106 through which the upper ends of the trunnions 8 pass and are fixedly held in position by means of the bolts 107. The base 7 is so fixed on the table 1 that just one can end at a time may drop onto the table beneath the base, the shifting member 4 slides under the base 7 and engages the lowermost can end in the stack. In order that the lower can end may be disengaged from those above, adjustable knives 108 are mounted opposingly on the side of the base 7 under which the can end passes and the ends 109 thereof are adapted to project between the lowermost can end and the one thereabove and force them apart whereby the lower one can be easily removed without the balance being disturbed.

The chuck and turn table may be removed and replaced with others of different sizes for use with can ends of various sizes.

These machines may be connected in pairs, and two or more be fed by one operator, the entire operation of the machine being mechanical with the exception of stacking the can ends in the frame 6.

Having now described my invention, that which I claim to be new and desire to procure by Letters Patent is:

1. A lining machine having means for clamping and rotating a can end whereby it may be lined, a turn-table upon which said can end is adapted to seat, said turn-table having a reciprocating movement, and said rotating means consisting of an independently rotatable chuck and a cam operated lever for reciprocating said turn table.

2. A lining machine having means for clamping and rotating a can end whereby it may be lined, a turn-table upon which said can end is adapted to seat, said turn-table having a reciprocating movement, said rotating means consisting of an independently rotatable chuck, between which and said turn-table said can end is adapted to be clamped and a cam operated lever for reciprocating said turn table.

3. A lining machine having means for clamping and rotating a can end whereby it may be lined, a turn-table upon which said can end is adapted to seat, said turn-table having a reciprocating movement, said rotating means consisting of an independently rotatable chuck, between which and said turn-table said can end is adapted to be clamped, and an adjustable lining member for depositing a coating on said can and a cam operated lever for reciprocating said turn-table.

4. A lining machine having means for clamping and rotating a can end whereby it may be lined, a turn-table upon which said can end is adapted to seat, said turn-table having a reciprocating movement, said rotating means consisting of an independently rotatable chuck, between which and said turn-table said can end is adapted to be clamped, a pivotally adjustable lining member for depositing a coating on said can, and a reciprocating valve in said lining member.

5. A lining machine having means for clamping and rotating a can end whereby it may be lined, a turn-table upon which said can end is adapted to seat, said turn-table having a reciprocating movement, said rotating means consisting of an independently rotatable chuck, between which and said turn-table said can end is adapted to be clamped, a pivotally adjustable lining member for depositing a coating on said can, and a reciprocating valve in said lining member, said valve being operated by air pressure, a valve stem upon which said chuck is mounted, said stem adapted to control said pressure.

6. A lining machine having means for clamping and rotating a can end whereby it may be lined, a turn-table upon which said can end is adapted to seat, said turn-table having a reciprocating movement, said rotating means consisting of an independently rotatable chuck, between which and said turn-table said can end is adapted to be clamped, a pivotally adjustable lining member for depositing a coating on said can, and a reciprocating valve in said lining member, said valve being operated by air pressure in one direction and spring pressure in another direction, a valve stem upon which said chuck is mounted, said stem adapted to control said pressure.

7. A lining machine having means for clamping and rotating a can end whereby it may be lined, a turn-table upon which said can end is adapted to seat, said turn-table having a reciprocating movement, said rotating means consisting of a rotatable chuck, between which and said turn-table said can end is adapted to be clamped, an adjustable lining member for depositing a coating on said can, a reciprocating valve in said lining member, said valve being operated by air pressure in one direction and spring pressure in another direction, and a reciprocating valve stem adapted to regulate said air pressure.

8. A lining machine having means for clamping and rotating a can end whereby it may be lined, a turn-table upon which said can end is adapted to seat, said turn-table having a reciprocating movement, said rotating means consisting of a rotatable chuck, between which and said turn-table said can end is adapted to be clamped, an adjustable lining member for depositing a coating on said can, a reciprocating valve in said lining member, said valve being operated by air pressure in one direction and spring pressure in another direction, and a reciprocating valve stem adapted to regulate said air pressure, said can ends adapted to operate said stem.

9. In a can machine, means whereby an uncoated can end is caused to displace a coated can end by contacting and pushing it aside.

10. In a can end lining machine, an air controlled lining member having means for depositing a lining upon said can ends, said lining member consisting of a horizontally pivoted tubular member.

11. In a can end lining machine, an air controlled lining member having means for depositing a lining upon said can ends, said lining member consisting of a horizontally pivoted tubular member, said member having an opening therein for the passage of a lining fluid.

12. In a can end lining machine, an air controlled lining member having means for depositing a lining upon said can ends, said lining member consisting of a horizontally pivoted tubular member, said member having an opening therein for the passage of a lining fluid, said fluid being under pressure whereby it may be forced through said member.

13. In a can end lining machine, an air controlled lining member having means for depositing a lining upon said can ends, said lining member consisting of a horizontally pivoted tubular member, said member having an opening therein for the passage of a lining fluid, said fluid being under pressure whereby it may be forced through said member, and a reciprocating valve member in said lining member.

14. In a can end lining machine, an air controlled lining member having means for depositing a lining upon said can ends, said lining member consisting of a horizontally pivoted tubular member, said member having an opening therein for the passage of a lining fluid, said fluid being under pressure whereby it may be forced through said member, and a reciprocating valve member in said lining member, said valve member being automatically operated.

15. In a can end lining machine, a lining member having means for depositing a lining upon said can ends, said lining member consisting of a pivotally mounted tubular member, said member having an opening therein for the passage of a lining fluid, said fluid being under pressure whereby it may be forced through said member, and a reciprocating valve member in said lining member, said valve member being automatically operated by means of air pressure.

16. In a can end lining machine, a lining member having means for depositing a lining upon said can ends, said lining member consisting of a pivotally mounted tubular member, said member having an opening therein for the passage of a lining fluid, said fluid being under pressure whereby it may be forced through said member, a reciprocating valve member in said lining member, said valve member being automatically operated by means of air pressure, and a spring by means of which said valve member is held normally raised.

17. In a can end lining machine, a lining member having means for depositing a lining upon said can ends, said lining member consisting of a pivotally mounted tubular member, said member having an opening therein for the passage of a lining fluid, said fluid being under pressure whereby it may be forced through said member, a reciprocating valve member in said lining member, said valve member being automatically operated by means of air pressure, and a spring by means of which said valve member is held normally raised, said valve member being fixedly secured at one end thereof to a diaphragm.

18. In a can end lining machine, a lining member having means for depositing a lining upon said can ends, said lining member consisting of a pivotally mounted tubular member, said member having an opening therein for the passage of a lining fluid, said fluid being under pressure whereby it may be forced through said member, a reciprocating valve member in said lining member, said valve member being automatically operated by means of air pressure, a spring by means of which said valve member is held normally raised, said valve member being fixedly secured at one end thereof to a diaphragm, said air pressure adapted to operate said diaphragm.

19. In a can end lining machine, a lining member having means for depositing a lining upon said can ends, said lining member consisting of a pivotally mounted tubular member, said member having an opening therein for the passage of a lining fluid, said fluid being under pressure whereby it may be forced through said member, a reciprocating valve member in said lining member, said valve member being automatically operated by means of air pressure, a spring by means of which said valve member is held normally raised, said valve member being fixedly secured at one end thereof to a diaphragm, said air pressure adapted to operate said diaphragm, and a lever by means of which said valve member may be held fixedly closed.

20. In a can end lining machine, a lining member having means for depositing a lining upon said can ends, said lining member consisting of a pivotally mounted tubular member, said member having an opening therein for the passage of a lining fluid, said fluid being under pressure whereby it may be forced through said member, a reciprocating valve member in said lining member, said valve member being automatically operated by means of air pressure, a spring by means of which said valve member is held normally raised, said valve member being fixedly secured at one end thereof to a diaphragm, said air pressure adapted to operate said diaphragm.

21. In a can machine a reciprocating member adapted to cause a coated can end to be displaced by means of an uncoated can end, means adapted to be operated by said uncoated can end for depositing a coating on said can end.

22. In a can machine a reciprocating member adapted to cause a coated can end to be displaced by means of an uncoated can end, means adapted to be operated by said uncoated can end for depositing a coating on said can end, a turn table adapted to receive said can end, a resilient spindle for said table, a lever adapted to raise said table and a cam to operate said lever.

23. In a can machine a reciprocating member adapted to cause a coated can end to be displaced by means of an uncoated can end, means adapted to be operated by said uncoated can end for depositing a coating on said can end, a turn table adapted to receive said can end, a resilient spindle for said table, a lever adapted to raise said table and a cam to operate said lever, a cam wheel for operating said lever.

24. In a can end lining machine a lining means, means for fixedly holding a can end, said means consisting of a co-acting chuck and turn table, a reciprocating valve stem projecting from said chuck, a valve connected to said stem, adapted to be operated thereby, and an air chamber in which said valve is adapted to operate to control a lining supply.

25. In a can end lining machine a lining means, means for fixedly holding a can end, said means consisting of a co-acting chuck and turn table, a reciprocating valve stem projecting from said chuck, a valve connected to said stem, adapted to be operated thereby, an air chamber in which said valve is adapted to operate to control a lining supply, said air chamber having an air inlet thereto.

26. In a can end lining machine a lining means, means for fixedly holding a can end, said means consisting of a co-acting chuck and turn table, a reciprocating valve stem projecting from said chuck, a valve connected to said stem adapted to be operated thereby, an air chamber in which said valve is adapted to operate to control a lining supply, said air chamber having an air inlet thereto, the upward movement of said stem adapted to close said air inlet.

27. In a can end lining machine a lining means, means for fixedly holding a can end, said means consisting of a co-acting chuck and turn table, a reciprocating valve stem projecting from said chuck, a valve connected to said stem adapted to be operated thereby, an air chamber in which said valve is adapted to operate to control a lining supply, said chamber having an air inlet thereto, the upward movement of said stem adapted to close said air inlet, said valve member being fixedly secured at one end thereof to a diaphragm, said upward movement of said stem adapted to relieve the pressure from said diaphragm.

28. In a can end lining machine, means for fixedly holding a can end, said means consisting of a co-acting chuck and turn table, a reciprocating valve stem projecting from said chuck, a valve connected to said stem adapted to be operated thereby, an air chamber in which said valve is adapted to operate to control a lining supply, said air chamber having an air inlet thereto, said valve member being fixedly secured at one end thereof to a diaphragm, the upward movement of said valve stem adapted to close said air inlet and relieve the pressure from said diaphragm, and a lining member connected to said air chamber by means of an air tube.

29. In a can end lining machine, means for fixedly holding a can end, said means consisting of a co-acting chuck and turn table, a reciprocating valve stem projecting from said chuck, a valve connected to said stem adapted to be operated thereby, an air chamber in which said valve is adapted to operate to control a lining supply, said air chamber having an air inlet thereto, said valve member being fixedly secured at one end thereof to a diaphragm, the upward movement of said valve stem adapted to close said air inlet and relieve the pressure from said diaphragm, a lining member connected to said air chamber by means of an air tube, said lining member having a diaphragm with an operated valve stem therein.

30. In a can end lining machine means for fixedly holding a can end, said means consisting of a co-acting chuck and turn-table, a reciprocating valve stem projecting from said chuck, a valve connected to said stem adapted to be operated thereby, an air chamber in which said valve is adapted to operate to control a lining supply, said air chamber having an air inlet thereto, said valve member being fixedly secured at one end thereof to a diaphragm, the upward movement of said valve stem adapted to close said air inlet and relieve the pressure from said diaphragm, a lining member connected to said air chamber by means of an air tube, said lining member having a diaphragm with an operated valve stem therein, said valve stem when lowered adapted to open said inlet and admit air under pressure into said air chamber and said air tube, whereby said diaphragm may be operated.

31. In a can end lining machine an annular adjustable means for supporting a stack of can ends.

32. In a can end lining machine an annular adjustable means for supporting a stack of can ends, and a turn-table adapted to receive a can end.

33. In a can end lining machine an annular adjustable means for supporting a stack of can ends, a turn-table adapted to receive a can end, and means for automatically detaching said can ends from the bottom of said stack one at a time and delivering them to said turn-table.

34. In a can machine a reciprocating member adapted to cause a coated can end to be displaced by means of an uncoated can end, means adapted to be operated by said uncoated can end for depositing a coating on said can end, a turn table adapted to receive said can end, a resilient spindle for said table, a lever adapted to raise said table and a cam to operate said lever, a cam wheel for operating said lever, a rocking bar operated by said wheel whereby said reciprocating member is operated.

35. In a can machine means for gripping a can end and means for depositing a coating on said can end, said latter means adapted to be operated by said can end.

36. In a can maker's machine, means for holding a can end to be lined and a valve operating rod adapted to project through said means and displace said can end from said means.

37. In a can maker's machine, means for holding a can end to be lined and a valve operating rod adapted to displace said can end from said means, said rod being spring pressed and movable independently of said means.

38. In a can end lining machine, means for holding a can end, means whereby said can end may be given two revolutions while being coated, said means consisting of a turn table, said turn table loosely mounted upon a spindle and a lever for operating said spindle.

39. In a lining machine a member adapted to deposit a lining material and means whereby said member may be adjusted to different angles for making said deposit, a fixed pipe for delivering said material to said member, air controlled means for controlling said deposit.

40. In a lining machine a member adapted to deposit a lining material, means whereby said member may be adjusted to different angles for making said deposit, a fixed pipe for delivering said material to said member, air controlled means for controlling said deposit, a vertically operating stem adapted to control the air for controlling said means.

41. In a lining machine a member adapted to deposit a lining material, means whereby said member may be adjusted to different angles for making said deposit, a fixed pipe for delivering said material to said member, air controlled means for controlling said deposit, a vertically operating stem adapted to control the air for controlling said means, can ends adapted to control said stem.

42. In a lining machine, a valve for operating a fluid controller, said valve being air pressed in one direction and spring pressed in an opposite direction, means for locking said valve in a fixed position, and a reciprocating valve stem for regulating said air pressure.

43. In a lining machine, a valve for operating a fluid controller, said valve being air pressed in one direction and spring pressed in an opposite direction, means for locking said valve in a fixed position, a reciprocating valve stem for regulating said air pressure, said reciprocating stem adapted to be operated by a can end.

44. In a lining machine for can ends a fluid distributer, and means whereby said can end will control said distributer.

45. In combination with a can end controlling machine, an independent lining machine.

46. In combination with a can end controlling machine, an independent lining machine, said lining machine being pivotally mounted whereby it may line can ends of varying sizes.

47. In combination with a can end controlling machine, an independent lining machine, connections between said machines whereby they may be conjunctively operated.

48. In combination with a can end controlling machine, an independent lining machine, connections between said machines whereby they may be conjunctively operated, said connection being an air line.

49. In combination with a can end controlling machine, an independent lining machine, connections between said machines whereby they may be conjunctively operated, said connection being an air line, said line being flexible, and said conjunctive operation being brought about by air pressure.

50. In a can machine, means for holding a can end, a spring operated valve member adapted to cause the deposition of a lining on said end, said end adapted to cause the operation of said valve, a vertical movable rod by means of which said valve member is controlled, means on said rod for regulating said air pressure operating said valve member, and said valve member being pivotally mounted.

51. In a lining machine a member adapted to deposit a lining material, means whereby said member may be adjusted to different angles for making said deposit, a fixed pipe for delivering said material to said member, air controlled means for controlling said deposit, a vertically operating stem adapted to control the air for controlling said means, said stem being operated by can ends adapted to receive said lining.

52. In a lining machine a member adapted to deposit a lining material, means whereby said member may be adjusted to different angles for making said deposit, a fixed pipe for delivering said material to said member, air controlled means for controlling said deposit, a vertically operating stem adapted to control the air for controlling said means, said stem being operated by can ends adapted to receive said lining, means whereby an unlined can end will be caused to push said lined can end from its seat under said stem.

53. In a lining machine a member adapted to deposit a lining material, means whereby said member may be adjusted to different angles for making said deposit, a fixed pipe for delivering said material to said member, air controlled means for controlling said deposit, a vertically operating stem adapted to control the air for controlling said means, said stem adapted to be operated by can ends, a turn table to receive said can ends.

54. In a lining machine a member adapted to deposit a lining material, means whereby said member may be adjusted to different angles for making said deposit, a fixed pipe for delivering said material to said member, air controlled means for controlling said deposit, a vertically operating stem adapted to control the air for controlling said means, adapted to be controlled by can ends, a turn table to receive said can ends, said table being directly under said stem.

55. In a lining machine a member adapted to deposit a lining material, means whereby said member may be adjusted to different angles for making said deposit, a fixed pipe for delivering said material to said member, air controlled means for controlling said deposit, a vertically operating stem adapted to control the air for controlling said means, adapted to be controlled by can ends, a turn table to receive said can ends, said table being directly under said stem, a chuck revoluble around said stem.

56. In a lining machine a member adapted to deposit a lining material, means whereby said member may be adjusted to different angles for making said deposit, a fixed pipe for delivering said material to said member, air controlled means for controlling said deposit, a vertically operating stem adapted to control the air for controlling said means, adapted to be controlled by can ends, a turn table to receive said can ends, said table being directly under said stem, a chuck revoluble around said stem, means for thrusting said table toward said chuck whereby it will be rotated thereby.

57. In a lining machine a member adapted to deposit a lining material, means whereby said member may be adjusted to different angles for making said deposit, a fixed pipe for delivering said material to said member, air controlled means for controlling said deposit, a vertically operating stem adapted to control the air for controlling said means, adapted to be controlled by can ends, a turn table to receive said can ends, said table being directly under said stem, a chuck revoluble around said stem, means for thrusting said table toward said chuck whereby it will be rotated thereby, said means consisting of a lever.

58. In a lining machine a member adapted to deposit a lining material, means whereby said member may be adjusted to different angles for making said deposit, a fixed pipe for delivering said material to said member, air controlled means for controlling said deposit, a vertically operating stem adapted to control the air for controlling said means, adapted to be controlled by can ends, a turn table to receive said can ends, said table being directly under said stem, a chuck revoluble around said stem, means for thrusting said table toward said chuck whereby it will be rotated thereby, said means consisting of a lever, said lever being pivoted.

59. In a lining machine a member adapted to deposit a lining material, means whereby said member may be adjusted to different angles for making said deposit, a fixed pipe for delivering said material to said member, air controlled means for controlling said deposit, a vertically operating stem adapted to control the air for controlling said means, adapted to be controlled by can ends, a turn table to receive said can ends, said table being directly under said stem, a chuck revoluble around said stem, means for thrusting said table toward said chuck whereby it will be rotated thereby, said means consisting of a lever, said lever being pivoted, and operated by means of a cam.

60. In a lining machine a member adapted to deposit a lining material, means whereby said member may be adjusted to different angles for making said deposit, a fixed pipe for delivering said material to said member, air controlled means for controlling said deposit, a vertically operating stem adapted to control the air for controlling said means, adapted to be controlled by can ends, a turn table to receive said can ends, said table being directly under said stem, a chuck revoluble around said stem, means for thrusting said table toward said chuck whereby it will be rotated thereby, said means consisting of a lever, said lever being pivoted and operated by means of a cam wheel, rotatably mounted.

61. In a lining machine a member adapted to deposit a lining material, means whereby said member may be adjusted to different angles for making said deposit, a fixed pipe for delivering said material to said member, air controlled means for controlling said deposit, a vertically operating stem adapted to control the air for controlling said means, adapted to be controlled by can ends, a turn table to receive said can ends, said table being directly under said stem, a chuck revoluble around said stem, means for thrusting said table toward said chuck whereby it will be rotated thereby, means for adjusting the thrust of said table.

62. In a lining machine a member adapted to deposit a lining material, means whereby said member may be adjusted to different angles for making said deposit, a fixed pipe for delivering said material to said member, air controlled means for controlling said deposit, a vertically operating stem adapted to control the air for controlling said means, adapted to be controlled by can ends, a turn table to receive said can ends, said table being directly under said stem, a chuck revoluble around said stem, means for thrusting said table toward said chuck whereby it will be rotated thereby, means for adjusting the thrust of said table, a sectional solid spindle upon which said table is mounted.

63. In a lining machine a member adapted to deposit a lining material, means whereby said member may be adjusted to different angles for making said deposit, a fixed pipe for delivering said material to said member, air controlled means for controlling said deposit, a vertically operating stem adapted to control the air for controlling said means, adapted to be controlled by can ends, a turn table to receive said can ends, said table being directly under said stem, a chuck revoluble around said stem, means for thrusting said table toward said chuck whereby it will be rotated thereby, means for adjusting the thrust of said table, a sectional solid spindle upon which said table is mounted, a spring interposed between the sections of said spindle.

In testimony whereof I affix my signature in presence of two witnesses.

JAMES M. HENRY.

Witnesses:
L. C. WEITERSHAUSEN,
R. B. WEITERSHAUSEN.

---

Copies of this patent may be obtained for five cents each, by addressing the "Commissioner of Patents, Washington, D. C."